(12) United States Patent
Yoshida

(10) Patent No.: US 9,970,556 B2
(45) Date of Patent: May 15, 2018

(54) DIRECTIONAL CONTROL VALVE

(71) Applicant: KYB Corporation, Tokyo (JP)

(72) Inventor: Futoshi Yoshida, Kanagawa (JP)

(73) Assignee: KYB Corporation, Tokyo (JP)

( * ) Notice: Subject to any disclaimer, the term of this patent is extended or adjusted under 35 U.S.C. 154(b) by 0 days. days.

(21) Appl. No.: 15/125,613

(22) PCT Filed: Jul. 14, 2015

(86) PCT No.: PCT/JP2015/070104
§ 371 (c)(1),
(2) Date: Sep. 13, 2016

(87) PCT Pub. No.: WO2016/013445
PCT Pub. Date: Jan. 28, 2016

(65) Prior Publication Data
US 2017/0002937 A1 Jan. 5, 2017

(30) Foreign Application Priority Data
Jul. 24, 2014 (JP) .................................. 2014-150797

(51) Int. Cl.
*F16K 11/07* (2006.01)
*F16K 31/122* (2006.01)
(Continued)

(52) U.S. Cl.
CPC .......... *F16K 11/07* (2013.01); *F15B 13/0435* (2013.01); *F16K 31/122* (2013.01);
(Continued)

(58) Field of Classification Search
CPC ....... Y10T 137/8659; Y10T 137/86598; Y10T 137/86606; Y10T 137/86614; Y10T 137/8671; Y10T 137/87201; Y10T 137/87209; F16K 11/07; F16K 31/122; F16K 31/42; F15B 13/0402; F15B 13/0409; F15B 13/0435; F15B 13/06
(Continued)

(56) References Cited

U.S. PATENT DOCUMENTS 3,023,782 A * 3/1962 Chaves, Jr. ......... F15B 13/0438
137/85
3,209,782 A * 10/1965 Wolpin ............... F15B 13/0438
137/625.62
(Continued)

FOREIGN PATENT DOCUMENTS

| JP | H01112005 A | 4/1989 |
| JP | H06307408 A | 11/1994 |
| JP | 2006-300195 A | 11/2006 |

*Primary Examiner* — William McCalister
(74) *Attorney, Agent, or Firm* — Rabin & Berdo, P.C.

(57) ABSTRACT

In a directional control valve, working fluid to be supplied to a first pressure chamber is supplied to the first pressure chamber via a hydrostatic bearing provided on an end of a main spool on the first pressure chamber side, and working fluid to be supplied to a second pressure chamber is supplied to the second pressure chamber via a hydrostatic bearing provided on an end of the main spool on the second pressure chamber side, and a pilot valve alternately communicates the first pressure chamber and the second pressure chamber with a tank.

1 Claim, 1 Drawing Sheet

(51) Int. Cl.
*F16K 31/42* (2006.01)
*F15B 13/043* (2006.01)
*F15B 13/04* (2006.01)
*F15B 21/06* (2006.01)

(52) U.S. Cl.
CPC ........ *F16K 31/426* (2013.01); *F15B 13/0402* (2013.01); *F15B 21/06* (2013.01); *F15B 2013/0409* (2013.01)

(58) Field of Classification Search
USPC .............. 137/625.6, 625.62, 625.63, 625.64, 137/625.69, 596.15, 596.17
See application file for complete search history.

(56) References Cited

U.S. PATENT DOCUMENTS

| | | | | | |
|---|---|---|---|---|---|
| 3,513,753 | A | * | 5/1970 | Phillips | F15B 13/0402 137/596.2 |
| 3,581,772 | A | * | 6/1971 | Wills | F15B 13/12 137/625.69 |
| 3,698,437 | A | * | 10/1972 | Cox | F15B 13/0438 137/625.62 |
| 3,736,958 | A | * | 6/1973 | Rostad | F16K 11/07 137/625.6 |
| 3,774,641 | A | * | 11/1973 | Mindner | B64C 13/00 137/625.64 |
| 4,257,456 | A | * | 3/1981 | Elliston | F15B 13/0417 137/596.1 |
| 4,527,772 | A | * | 7/1985 | Kebede | F16K 31/10 137/82 |
| 4,705,059 | A | * | 11/1987 | Lecerf | F15B 13/0438 137/625.61 |
| 5,697,401 | A | * | 12/1997 | Shinoda | F15B 13/0438 137/625.62 |
| 5,769,545 | A | * | 6/1998 | Bently | F16C 32/0644 384/114 |
| 5,785,087 | A | * | 7/1998 | Takahashi | F15B 13/0402 137/238 |
| 5,868,157 | A | * | 2/1999 | Yoshimura | F15B 13/0402 137/269 |
| 5,992,460 | A | * | 11/1999 | Akimoto | F15B 11/123 137/625.64 |
| 6,648,014 | B1 | * | 11/2003 | Takahashi | F15B 13/0438 137/545 |
| 6,659,121 | B1 | * | 12/2003 | Takahashi | F16K 31/0613 137/238 |
| 2012/0255617 | A1 | * | 10/2012 | Miyazoe | F15B 13/0402 137/1 |
| 2015/0330519 | A1 | * | 11/2015 | Maurer | F16K 11/04 137/565.26 |

\* cited by examiner

DIRECTIONAL CONTROL VALVE

TECHNICAL FIELD

The present invention relates to a directional control valve for controlling a direction in which working fluid flows.

BACKGROUND ART

JP2006-300195A discloses a directional control valve including a main valve for switching a direction in which working fluid flows and a pilot valve for switching the main valve by pilot pressure, and which working fluid is supplied to both the main valve and the pilot valve from a pressure source.

In the above directional control valve, two control ports of the pilot valve communicate with pressure chambers each formed on either side of a main spool of the main valve. By moving the pilot spool of the pilot valve by a solenoid, and by communicating the supply port of the pilot valve to which the working fluid is supplied with either one of the two control ports, the main spool moves due to generation of a differential pressure between the two pressure chambers of the main valve. As a result, the two control ports of the main valve communicate alternately with the supply port of the main valve into which the working fluid is supplied.

SUMMARY OF INVENTION

In the above directional control valve, the pressure of the pressure chamber is controlled by adjusting the amount of working fluid to be supplied from the pilot valve to the pressure chamber of the main valve. That is to say, the above directional control valve is a meter-in circuit. Therefore, the controllability of the directional control valve has room for improvement.

The present invention has an object to improve the controllability of a directional control valve.

According to one aspect of the present invention, a directional control valve includes a main valve configured to switch a direction in which working fluid flows; and a pilot valve configured to switch the main valve by pilot pressure is provided. The main valve includes a supply port configured to be supplied with working fluid from a pressure source; a first main valve control port and a second main valve control port, each configured to supply and discharge working fluid outside; a main spool disposed movably in an axial direction, the main spool being configured to communicate the supply port with the first main valve control port when moved to one side, the main spool being configured to communicate the supply port with the second main valve control port when moved to the other side; and a first pressure chamber and a second pressure chamber formed on either side of the main spool in the axial direction and configured to be supplied with working fluid from the pressure source. Working fluid supplied from the pressure source to the first pressure chamber is supplied to the first pressure chamber via a hydrostatic bearing provided on an end of the main spool on the first pressure chamber side. Working fluid supplied from the pressure source to the second pressure chamber is supplied to the second pressure chamber via a hydrostatic bearing provided on an end of the main spool on the second pressure chamber side. The pilot valve makes the first pressure chamber and the second pressure chamber alternately communicate with a tank.

DESCRIPTION OF EMBODIMENTS

Figure 1:
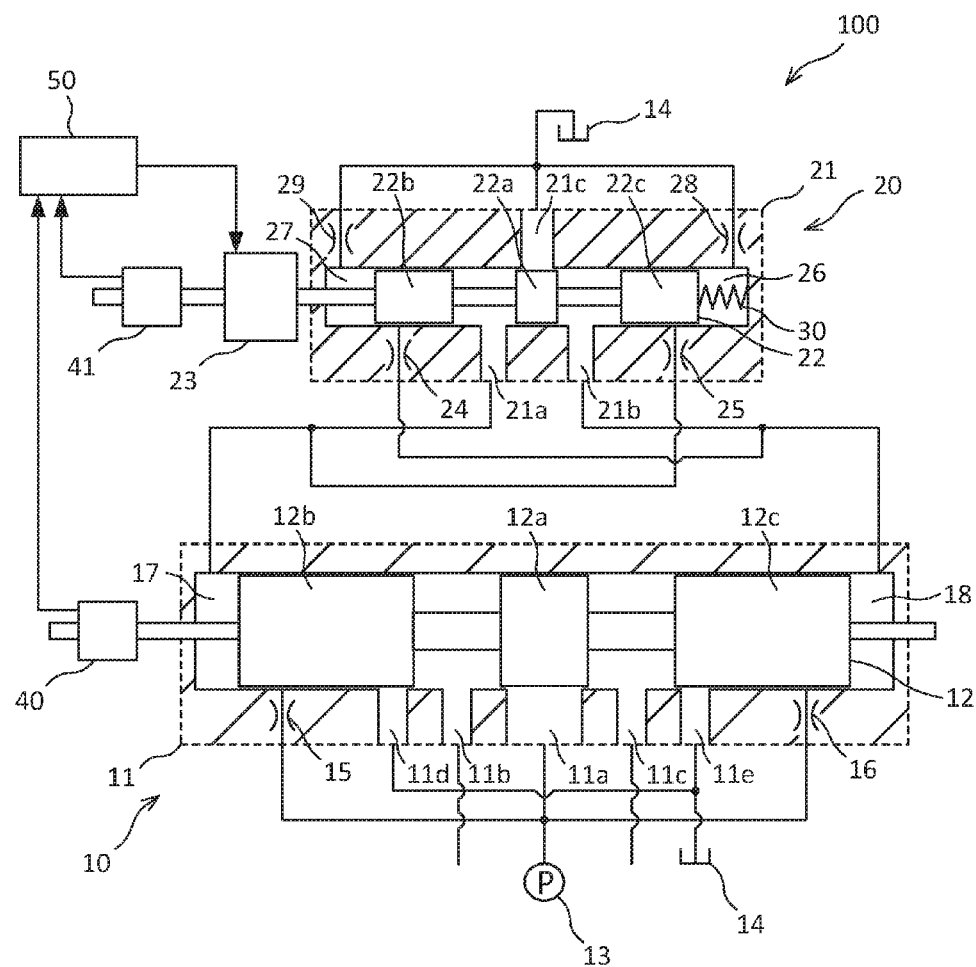
FIG. 1 is a schematic view showing a directional control valve according to an embodiment of the present invention.

Described below is a directional control valve 100 according to an embodiment of the present invention, with reference to the drawings.

The directional control valve 100 is applied to a fluid pressure device (not illustrated) such as an actuator, and is a control valve that controls operation of the fluid pressure device by switching a flowing direction of operating water that serves as a working fluid.

The directional control valve 100 includes a main valve 10 that switches a flowing direction of the operating water, and a pilot valve 20 that switches the main valve 10 by pilot pressure.

The main valve 10 includes a main housing 11 and a main spool 12.

The main housing 11 has a supply port 11a which the operating water is supplied from the pressure source 13, a first main valve control port 11b (hereinafter, called control port 11b.) and a second main valve control port 11c (hereinafter, called control port 11c.) which the operating water is supplied to and discharged from the fluid pressure device, and discharge ports 11d and 11e that communicate with a tank 14.

In the present embodiment, as shown in FIG. 1, the main housing has the supply port 11a provided in a center section thereof, the control ports 11b and 11c provided on either sides of the supply port 11a, and further the discharge ports 11d and 11e provided on outer sides of the control ports 11b and 11c, respectively.

The main spool 12 is housed within the main housing 11 movably in an axial direction.

The main spool 12 has a land section 12a provided in the center thereof, and land sections 12b and 12c provided on either ends thereof.

Hydrostatic bearings 15 and 16 are provided on either ends of the main spool 12, respectively. The hydrostatic bearings 15 and 16 are supplied with operating water from the pressure source 13.

Accordingly, a water screen is formed between the main housing and the land sections 12b and 12c of the main spool 12, and the main spool 12 is supported in a floating state in the main housing 11. Therefore, the occurrence of galling can be prevented between the main spool 12 and the main housing 11 even if the operating water is used as the working fluid, and it is possible to actuate the main spool 12 smoothly.

On both sides of the main spool 12 in the axial direction, a first pressure chamber 17 (hereinafter, called pressure chamber 17.) and a second pressure chamber 18 (hereinafter, called pressure chamber 18.) are each formed by the main spool 12 and the main housing 11.

The operating water supplied from the pressure source 13 to the hydrostatic bearing 15 flows into the pressure chamber 17 by passing through a gap between the main housing 11 and the land section 12b of the main spool 12. Similarly, the operating water supplied from the pressure source 13 to the hydrostatic bearing 16 flows into the pressure chamber 18 by passing through a gap between the main housing 11 and the land section 12c of the main spool 12.

The main valve 10 is configured as described above, and as shown in FIG. 1, in a state in which the main spool 12 is disposed in the center of the main housing 11, the land section 12a closes the supply port 11a, the land section 12b closes the discharge port 11d, and the land section 12c closes the discharge port 11e.

When the main spool 12 moves from the state shown in FIG. 1 to the pressure chamber 18 side, the supply port 11a communicates with the control port 11b and the control port 11c communicates with the discharge port 11e. Accordingly, the operating water is supplied to the fluid pressure device from the control port 11b, and the operating water flown out from the fluid pressure device is discharged to the tank 14 via the control port 11c and the discharge port 11e.

On the contrary, when the main spool 12 moves toward the pressure chamber 17 side, the supply port 11a communicates with the control port 11c, and the control port 11b communicates with the discharge port 11d. Accordingly, the operating water is supplied to the fluid pressure device from the control port 11c, and the operating water flown out from the fluid pressure device is discharged to the tank 14 via the control port 11b and the discharge port 11d.

Next described is the pilot valve 20.

The pilot valve 20 includes a pilot housing 21, a pilot spool 22, and a solenoid 23.

The pilot housing 21 has a first pilot valve control port 21a (hereinafter, called control port 21a.) that communicates with the pressure chamber 17 of the main valve 10, a second pilot valve control port 21b (hereinafter, called control port 21b) that communicates with the pressure chamber 18 of the main valve 10, and a discharge port 21c that communicates with the tank 14.

In the present embodiment, as shown in FIG. 1, the discharge port 21c is disposed at a center section of the pilot housing 21, and the control ports 21a and 21b are provided on either sides of the discharge port 21c, respectively.

The pilot spool 22 is housed within the pilot housing 21 movably in an axial direction.

The pilot spool 22 has a land section 22a provided in the center thereof, and land sections 22b and 22c provided on either ends thereof, respectively.

Hydrostatic bearings 24 and 25 are provided on either ends of the pilot spool 22, respectively. The hydrostatic bearing 24 is supplied with operating water from the pressure chamber 18 of the main valve 10. Moreover, the hydrostatic bearing 25 is supplied with operating water from the pressure chamber 17 of the main valve 10.

Accordingly, as with the main valve 10, the pilot spool 22 can be actuated smoothly even when operating water is used as the working fluid.

As such, in the present embodiment, the operating water can be used as the working fluid, by providing the hydrostatic bearings 15 and 16 that support the main spool 12, and the hydrostatic bearings 24 and 25 that support the pilot spool 22.

Accordingly, it is possible to provide a directional control valve 100 having outstanding hygiene, safety, and environmental properties. As a result, it is possible to reduce risk management costs in a case in which the directional control valve 100 is applied to food machinery, semiconductor devices, underwater working machinery and like devices.

On either sides of the pilot spool 22 in the axial direction, a third pressure chamber 26 (hereinafter, called pressure chamber 26) and a fourth pressure chamber 27 (hereinafter, called pressure chamber 27) are formed by the pilot spool 22 and the pilot housing 21.

Operating water supplied to the hydrostatic bearing 25 from the pressure chamber 17 of the main valve 10 flows into the pressure chamber 26, by passing through a gap between the pilot housing 21 and the land section 22c of the pilot spool 22. Similarly, operating water supplied to the hydrostatic bearing 24 from the pressure chamber 18 of the main valve 10 flows into the pressure chamber 27 by passing through a gap between the pilot housing 21 and the land section 22b of the pilot spool 22.

The pressure chamber 26 communicates with the tank 14 via a throttle passage 28. Moreover, the pressure chamber 27 communicates with the tank 14 via a throttle passage 29.

The pilot valve 20 is configured as described above, and as shown in FIG. 1, in the state in which the pilot spool 22 is positioned in the center of the pilot housing 21, the land section 22a closes the discharge port 21c.

When the pilot spool 22 moves from the state shown in FIG. 1 to the pressure chamber 26 side, the discharge port 21c communicates with the control port 21a. As a result, the operating water is discharged to the tank 14 from the pressure chamber 17 communicating with the control port 21a.

On the contrary, when the pilot spool 22 moves toward the pressure chamber 27 side, the discharge port 21c communicates with the control port 21b. As a result, operating water is discharged to the tank 14 from the pressure chamber 18 communicating with the control port 21b.

The pressure chamber 26 is reduced in size when the pilot spool 22 moves toward the pressure chamber 26 side. At this time, the operating water corresponding to the reduced volume of the pressure chamber 26 is discharged to the tank 14 by passing through the throttle passage 28.

Similarly, the pressure chamber 27 is reduced in size when the pilot spool 22 moves toward the pressure chamber 27 side. The operating water corresponding to the reduced volume in the pressure chamber 27 is discharged to the tank 14 by passing through the throttle passage 29.

As such, since the directional control valve 100 includes the throttle passages 28 and 29 through which the operating water discharged from the pressure chambers 26 and 27 passes, it is possible to attenuate the vibration of the pilot spool 22 occurring with the movement of the pilot spool 22, and allows for stably actuating the pilot valve 20.

A spring 30 is disposed in the pressure chamber 26. The spring 30 constantly biases the pilot spool 22 toward the pressure chamber 27 side.

The solenoid 23 is disposed on an end of the pilot spool 22 opposite the spring 30.

The solenoid 23 causes thrust in a direction moving toward the pressure chamber 26 to act on the pilot spool 22, in response to a flowing current. Accordingly, the pilot spool 22 moves toward the pressure chamber 26 side against the biasing force of the spring 30.

The thrust acting on the pilot spool 22 increases as the flowing current of the solenoid 23 increases. Therefore, as the flowing current of the solenoid 23 increases, the pilot spool 22 moves greatly toward the pressure chamber 26.

On the contrary, as the flowing current of the solenoid 23 decreases, the pilot spool 22 moves toward the pressure chamber 27 side due to the biasing force of the spring 30. When no current is supplied to the solenoid 23, the pilot spool 22 moves toward the pressure chamber 27 side so as to be closest to the pressure chamber 27.

In the present embodiment, the main spool 12 and the pilot spool 22 are equipped with displacement meters 40 and 41, respectively. Output signals of the displacement meters 40 and 41 are inputted into a controller 50. The controller 50 causes the flowing current to the solenoid 23 to vary based on the output signal of the displacement meters 40 and 41.

The thrust that acts on the pilot spool 22 varies, as described above, based on the flowing current of the solenoid 23. Therefore, by varying the flowing current to the solenoid 23 at the controller 50, it is possible to change a position where the thrust acting on the pilot spool 22 and the biasing force of the spring 30 are balanced, that is to say, the position of the pilot spool 22.

A flow channel area while the discharge port 21c and control port 21a of the pilot valve 20 communicate with each other increases as the pilot spool 22 moves toward the pressure chamber 26 side. Moreover, the flow channel area while the discharge port 21c and control port 21b communicate with each other increases as the pilot spool 22 moves toward the pressure chamber 27 side.

Therefore, by changing the position of the pilot spool 22, it is possible to arbitrarily change the flow channel area through which operating water is discharged from the pressure chambers 17 and 18 of the main valve 10 to the tank 14, and allows for controlling the switching rate of the main valve 10.

Next described is the operation of the directional control valve 100.

The pilot valve 20 shown in FIG. 1 is in a state in which the controller 50 controls the flowing current of the solenoid 23 and the pilot spool 22 is positioned in the center of the pilot housing 21.

By increasing the flowing current of the solenoid 23 from this state, the pilot spool 22 moves toward the pressure chamber 26 side. Moreover, when the flowing current is decreased, the pilot spool 22 moves toward the pressure chamber 27 side. It is noted that the directional control valve 100 is symmetrical operated when the pilot spool 22 moves toward the pressure chamber 26 side and when the pilot spool 22 moves toward the pressure chamber 27 side. Therefore, in the descriptions hereafter, descriptions are provided for the case in which the pilot spool 22 moves toward the pressure chamber 26 side, and descriptions for the case in which the pilot spool 22 moves toward the pressure chamber 27 side will be omitted.

In the state shown in FIG. 1, the discharge port 21c of the pilot valve 20 communicates with neither of the control port 21a nor 21b. Therefore, the pressure of the pressure chambers 17 and 18 of the main valve 10 that communicate with the control ports 21a and 21b, respectively, become in an evenly increased state by having the operating water be supplied from the pressure source 13. At this time, no differential pressure generates on the pressure chambers 17 and 18, and thus the main spool 12 does not move from the position in FIG. 1.

Furthermore, as the flowing current of the solenoid 23 is increased from this state, the thrust acting on the pilot spool 22 increases, which thus moves the pilot spool 22 toward the pressure chamber 26 side. This causes the discharge port 21c to open and communicate with the control port 21a, and to discharge operating water to the tank 14 from the pressure chamber 17 communicating with the control port 21a.

When the operating water is discharged to the tank 14, the pressure of the pressure chamber 17 decreases. That is to say, since a differential pressure generates on the pressure chambers 17 and 18, the main spool 12 moves toward the pressure chamber 17 side that is the lower pressure side. Accordingly, the supply port 11a communicates with the control port 11c, and the control port 11b communicates with the discharge port 11d.

In order to stop the movement of the main spool 12, the communication of the discharge port 21c with the control port 21a is blocked to increase the pressure of the pressure chamber 17. Therefore, by decreasing the flowing current to the solenoid 23 to move the pilot spool 22 to the position shown in FIG. 1 and close the discharge port 21c, the pressure of the pressure chamber 17 increases and the differential pressure between the pressure chamber 17 and the pressure chamber 18 is eliminated. This allows for stopping the movement of the main spool 12.

When the operating water is discharged from the pressure chamber 17 to the tank 14, the pressure of the pressure chamber 17 decreases and the pressure of the pressure chamber 26 communicating with the pressure chamber 17 via the hydrostatic bearing 25 also decreases. Therefore, thrust in a direction moving towards the pressure chamber 26 acts on the pilot spool 22, due to the differential pressure of the pressure chambers 26 and 27.

Considered as another configuration for supplying the operating water to the pressure chamber 26 and 27 of the pilot valve 20, is a configuration in which the pressure chamber 18 of the main valve 10 is communicated with the pressure chamber 26 of the pilot valve 20, and the pressure chamber 17 of the main valve 10 is communicated with the pressure chamber 27 of the pilot valve 20.

However, with this configuration, when the pilot spool 22 is moved toward the pressure chamber 26 side and the operating water is discharged from the pressure chamber 17 to the tank 14, the pressure of the pressure chamber 17 decreases, and also the pressure of the pressure chamber 27 decreases. That is to say, thrust in the direction moving toward the pressure chamber 27 acts on the pilot spool 22, due to the differential pressure of the pressure chambers 26 and 27.

In this case, the thrust required to move the pilot spool 22 toward the pressure chamber 26 side increases, and thus a large solenoid with greater output is required, thereby increasing costs.

Meanwhile, in the present embodiment, as described above, the pressure chamber 17 of the main valve 10 is communicated with the pressure chamber 26 of the pilot valve 20, and thus thrust in the direction moving toward the pressure chamber 26, which is the progressing direction, is acted on the pilot spool 22.

This allows for reducing the thrust required to move the pilot spool 22, which thus can reduce the size of the solenoid 23, and can also reduce costs. The same applies with the case in which the pilot spool 22 moves toward the pressure chamber 27 side, and thus the size of the spring 30 can also be reduced.

Moreover, considered as another configuration of the directional control valve as described above is a configuration in which, for example, working fluid is supplied from the pressure source to both the main valve and the pilot valve, and by adjusting the amount of working fluid supplied from the pilot valve to the pressure chamber of the main valve, the pressure of the pressure chamber is controlled.

However, in the case of this configuration, the directional control valve is a meter-in circuit. Therefore, there is room for improvement as to its controllability.

Meanwhile, in the present embodiment, the operating water is supplied from the pressure source 13 to the pressure chambers 17 and 18 of the main valve 10. Furthermore, the pressure of the pressure chambers 17 and 18 are changed by alternately communicating the control ports 21a and 21b of the pilot valves 20 which are communicated with the pressure chambers 17 and 18, respectively, with the discharge port 21c, and discharging the operating water to the tank 14 from the pressure chambers 17 and 18.

That is to say, the directional control valve 100 is a meter-out circuit that controls the pressure of the pressure chambers 17 and 18 by adjusting the flow amount of operating water discharged from the pressure chambers 17 and 18. Therefore, it is possible to improve the controllability more than the directional control valve of a meter-in circuit.

As described above, according to the present embodiment, the operating water is supplied from the pressure source 13 to the pressure chamber 17 and 18 of the main valve 10. Further, the pressure chambers 17 and 18 alternately communicate with the tank 14, due to the pilot valve 20. According to this, the directional control valve 100 serves as a meter-out circuit that controls the pressure of the pressure chambers 17 and 18, by adjusting the flow amount of the operating water discharged from the pressure chambers 17 and 18. Therefore, it is possible to further improve the controllability of the directional control valve 100.

Moreover, the operating water can be used as the working fluid by providing the hydrostatic bearings 15 and 16 that support the main spool 12 and the hydrostatic bearings 24 and 25 that support the pilot spool 22. This allows for providing a directional control valve 100 having outstanding hygiene, safety, environmental properties. Therefore, it is possible to reduce risk management costs in a case in which the directional control valve 100 is applied to the food machinery and semiconductor devices, underwater working machinery and like devices.

Moreover, the pressure chamber 17 (18) of the main valve 10 is communicated with the pressure chamber 26 (27) of the pilot valve 20, so when the operating water is discharged from the pressure chamber 17 (18) to the tank 14, thrust in the direction of moving toward the pressure chamber 26 (27) side, which is the progressing direction, acts on the pilot spool 22 due to the differential pressure of the pressure chamber 26 and 27. Accordingly, the thrust required to move the pilot spool 22 can be made small, which thus allows for reducing the size of the solenoid 23 and spring 30, and costs.

The embodiments of the present invention described above are merely illustration of some application examples of the present invention and not of the nature to limit the technical scope of the present invention to the specific constructions of the above embodiments.

For example, in the above embodiments, operating water is used as the working fluid, but other liquids such as hydraulic oil and gases may also be used.

Moreover, in a case in which hydraulic oil is used as the working fluid and a lubricant film for smoothly operating the main spool 12 and the pilot spool 22 can be formed, no hydrostatic bearing 15, 16, 24, or 25 need to be provided. In this case, the hydraulic oil is directly supplied from the pressure source 13 to the pressure chamber 17 and 18 of the main valve 10, and the hydraulic oil may be directly supplied from the pressure chambers 17 and 18 to the pressure chambers 26 and 27 of the pilot valve 20.

Moreover, in the above embodiment, the operating water is supplied to the hydrostatic bearings 24 and 25 of the pilot spool 22 from the pressure chambers 17 and 18 of the main valve 10, however this can be supplied directly from the pressure source 13. In this case, the operating water may be directly supplied from the pressure chambers 17 and 18 of the main valve 10 to the pressure chambers 26 and 27 of the pilot valve 20.

Moreover, in the above embodiment, the main valve 10 includes the main housing 11 and the pilot valve 20 includes the pilot housing 21, however the main housing 11 and the pilot housing 21 may be provided integrally.

Moreover, in the above embodiment, the solenoid 23 and the spring 30 are used as the driving mechanism for moving the pilot spool 22, but this may be configured to include a solenoid 23 on either side of the pilot spool 22 without using the spring 30. Moreover, a servomotor may be used instead of the solenoid 23 and the spring 30.

Moreover, in the above embodiment, the displacement meter 40 is equipped to control the position of the main spool 12, however it may be possible to provide a spring to the pressure chambers 17 and 18 without performing positional control, so that the main spool 12 be automatically positioned in the center of the main housing 11.

The present application claims a priority based on Japanese Patent Application No. 2014-150797 filed with the Japan Patent Office on Jul. 24, 2014, all the contents of which are hereby incorporated by reference.

The invention claimed is:

1. A directional control valve, comprising:
   a main valve configured to switch a direction in which working fluid flows; and
   a pilot valve configured to switch the main valve by pilot pressure, wherein the main valve comprises:
   a supply port configured to be supplied with working fluid from a pressure source;
   a first main valve control port and a second main valve control port, each configured to supply and discharge working fluid outside;
   a main spool movably disposed in an axial direction, the main spool being configured to communicate the supply port with the first main valve control port when moved to one side, the main spool being configured to communicate the supply port with the second main valve control port when moved to the other side; and
   a first pressure chamber and a second pressure chamber formed on either side of the main spool in the axial direction, and being configured to be supplied with working fluid from the pressure source,
   wherein working fluid supplied from the pressure source to the first pressure chamber is supplied to the first pressure chamber via a first hydrostatic bearing provided on an end of the main spool on the first pressure chamber side,
   wherein working fluid supplied from the pressure source to the second pressure chamber is supplied to the second pressure chamber via a second hydrostatic bearing provided on an end of the main spool on the second pressure chamber side,
   wherein the pilot valve makes the first pressure chamber and the second pressure chamber alternately communicate with a tank, and
   wherein the pilot valve comprises:
   a first pilot valve control port communicating with the first pressure chamber;
   a second pilot valve control port communicating with the second pressure chamber;
   a discharge port communicating with the tank;
   a pilot spool movably disposed in an axial direction, the pilot spool being configured to communicate the first pilot valve control port with the discharge port when moved to one side, the pilot spool being configured to communicate the second pilot valve control port with the discharge port when moved to the other side;
   a driving mechanism configured to move the pilot spool;

a third pressure chamber formed on the one side in the axial direction of the pilot spool, the third pressure chamber being configured to be supplied with working fluid from the first pressure chamber via a third hydrostatic bearing provided on an end of the pilot spool on the one side; and a fourth pressure chamber formed on the other side in the axial direction of the pilot spool, the fourth pressure chamber being configured to be supplied with working fluid from the second pressure chamber via a fourth hydrostatic bearing provided on an end of the pilot spool on the other side.

* * * * *